(12) United States Patent
Suzuki et al.

(10) Patent No.: US 9,042,107 B2
(45) Date of Patent: May 26, 2015

(54) DISPLAY DEVICE AND ELECTRONIC APPARATUS

(75) Inventors: Masato Suzuki, Kanagawa (JP); Shota Nishi, Kanagawa (JP)

(73) Assignee: SONY CORPORATION (JP)

( * ) Notice: Subject to any disclaimer, the term of this patent is extended or adjusted under 35 U.S.C. 154(b) by 165 days.

(21) Appl. No.: 13/422,886

(22) Filed: Mar. 16, 2012

(65) Prior Publication Data

US 2012/0257362 A1  Oct. 11, 2012

(30) Foreign Application Priority Data

Apr. 6, 2011 (JP) ................................. 2011-084731

(51) Int. Cl.
| | |
|---|---|
| H05K 1/00 | (2006.01) |
| H05K 5/00 | (2006.01) |
| H05K 7/00 | (2006.01) |
| G06F 1/16 | (2006.01) |
| G02F 1/1345 | (2006.01) |

(52) U.S. Cl.
CPC .................................. *G02F 1/13452* (2013.01)

(58) Field of Classification Search
None
See application file for complete search history.

(56) References Cited

U.S. PATENT DOCUMENTS

| | | | | |
|---|---|---|---|---|
| 6,473,570 | B2 * | 10/2002 | Ito ................................. | 396/542 |
| 7,245,281 | B2 * | 7/2007 | Sekido et al. ................... | 345/87 |
| 7,623,354 | B2 * | 11/2009 | Koh ................................ | 361/764 |
| 2005/0088830 | A1 * | 4/2005 | Yumoto et al. ................ | 361/749 |
| 2008/0291380 | A1 * | 11/2008 | Sakikubo ....................... | 349/150 |
| 2010/0331060 | A1 * | 12/2010 | Yoshida ...................... | 455/575.1 |
| 2011/0181003 | A1 * | 7/2011 | Hayashi et al. ............... | 277/630 |

FOREIGN PATENT DOCUMENTS

WO     2009/004894     1/2009

* cited by examiner

*Primary Examiner* — Hoa C Nguyen
*Assistant Examiner* — Xanthia C Cunningham
(74) *Attorney, Agent, or Firm* — Sheridan Ross P.C.

(57) ABSTRACT

Disclosed herein is a display device including a main board part configured to have a display area including drive wiring and have a display panel disposed in the display area; and an auxiliary board part configured to be monolithic with the main board part and have extraction wiring from the drive wiring.

8 Claims, 8 Drawing Sheets

DISPLAY DEVICE AND ELECTRONIC APPARATUS

BACKGROUND

The present technique relates to a display device that performs displaying by inputting a signal from the external to drive wiring of a display area, and electronic apparatus including this display device.

In flat display devices such as liquid crystal display devices and electrophoretic display devices, a wiring board for inputting a signal from the external is connected to a display panel. This signal is supplied to drive wiring of the display panel via the wiring board. The display panel is so configured as to include a substrate and a display layer disposed at the center part on this substrate, and the wiring board is connected to a terminal provided at the peripheral part of the substrate (see e.g. WO2009/004894). The wiring board and the terminal are electrically connected to each other by using an anisotropic conductive film (ACF) and performing thermal compression bonding for example.

Furthermore, presently a flexible wiring board is used as the wiring board and it is folded near the connection part to the terminal along the outer shape of the display panel. Thereby, the thickness and the frame area are reduced.

SUMMARY

However, if thermal compression bonding is performed for the substrate over which the display layer is provided, possibly the substrate and the display layer deteriorate. Furthermore, if the wiring board is folded, repulsive force of the wiring board (spring back) is generated and there is also the possibility that disconnection between the terminal (substrate) and the wiring board occurs due to this spring back. Thus, the reliability of the display device is lowered.

There is a need for the present technique to provide a display device having enhanced reliability and electronic apparatus including this display device by avoiding the deterioration of the substrate and the display layer accompanying a step of connecting the substrate to the wiring board and disconnection between the substrate and the wiring board.

According to an embodiment of the present technique, there is provided a display device including a main board part that has a display area including drive wiring and has a display panel disposed in the display area, and an auxiliary board part that is monolithic with the main board part and has extraction wiring from the drive wiring.

According to another embodiment of the present technique, there is provided electronic apparatus including the above-described display device.

In the display device or the electronic apparatus according to the embodiment of the present technique, the auxiliary board part that is monolithic with the main board part is provided and thus a signal from the external is supplied to the drive wiring via the extraction wiring of the auxiliary board part.

In the display device and the electronic apparatus according to the embodiments of the present technique, the auxiliary board part is provided for the main board part having the display area and the extraction wiring is provided in this auxiliary board part. Thus, a signal from the external can be supplied to the drive wiring via the extraction wiring of the auxiliary board part without using a wiring board. That is, the deterioration of the substrate and the display layer due to a step of connecting the substrate to the wiring board does not occur and disconnection between the substrate and the wiring board also does not occur. Thus, the reliability of the display device is enhanced.

DETAILED DESCRIPTION OF THE PREFERRED EMBODIMENT

An embodiment of the present technique will be described in detail below with reference to the drawings. The order of the description is as follows.

Figure 1:
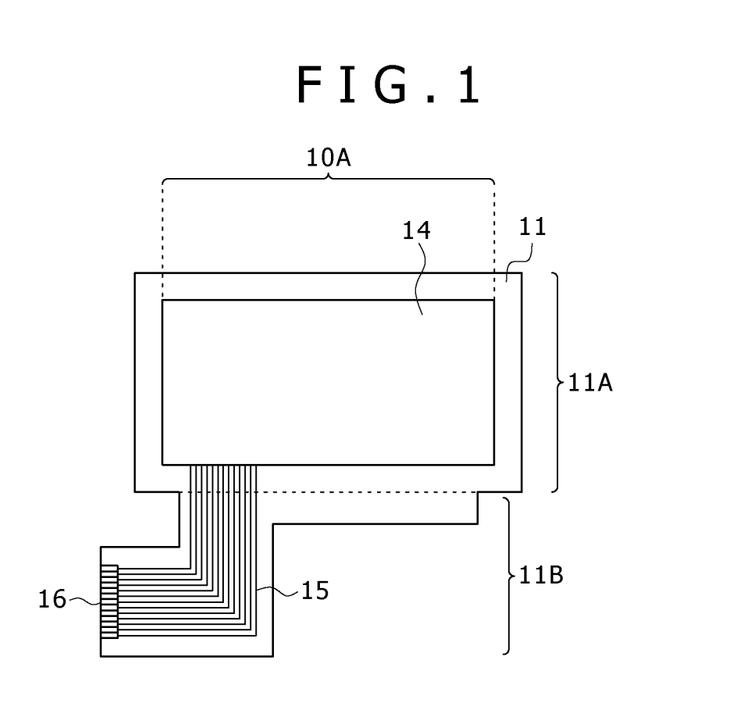
FIG. 1 is a plan view showing the configuration of part of a display device according to one embodiment of the present disclosure.
Figure 2:
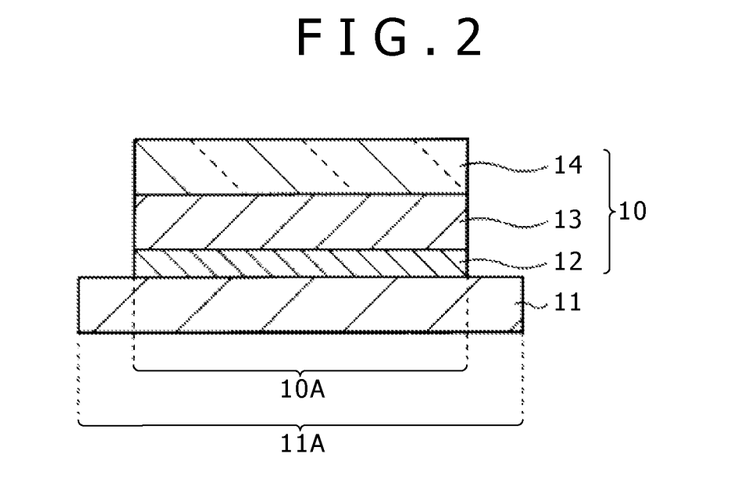
FIG. 2 is a sectional view showing the configuration of the display device shown in FIG. 1.

1. Embodiment display device in which auxiliary board part having L-character shape is so disposed as to be projected from one side of outer circumference of main board part 2. Modification Example 1 display device in which auxiliary board part having L-character shape is so disposed as to be projected from corner of outer circumference of main board part 3. Modification Example 2 display device in which outer circumference of whole substrate has rectangular shape 4. Application Examples Embodiment FIG. 1 shows the planar configuration of a substrate (substrate 11) of a display device (display device 1) according to one embodiment of the present disclosure. The display device 1 has a main board part 11A and an auxiliary board part 11B that is monolithic with this main board part 11A, and a display panel 10 is disposed in a display area 10A of the main board part 11A as shown in FIG. 2. The display panel 10 is obtained by stacking the substrate 11, a thin film transistor (TFT) layer 12, a display layer 13, and a transparent substrate 14 in that order.

The substrate 11 is composed of e.g. an inorganic material such as glass, quartz, silicon, and gallium arsenic, or a plastic material such as polyimide, polyethylene terephthalate (PET), polyethylene naphthalate (PEN), polymethyl methacrylate (PMMA), polycarbonate (PC), polyethersulfone (PES), polyetheretherketone (PEEK), and aromatic polyester (liquid crystal polymer). This substrate 11 may be a rigid substrate such as a wafer or may be a flexible substrate such as a thin-layer glass and a film.

Figure 3:
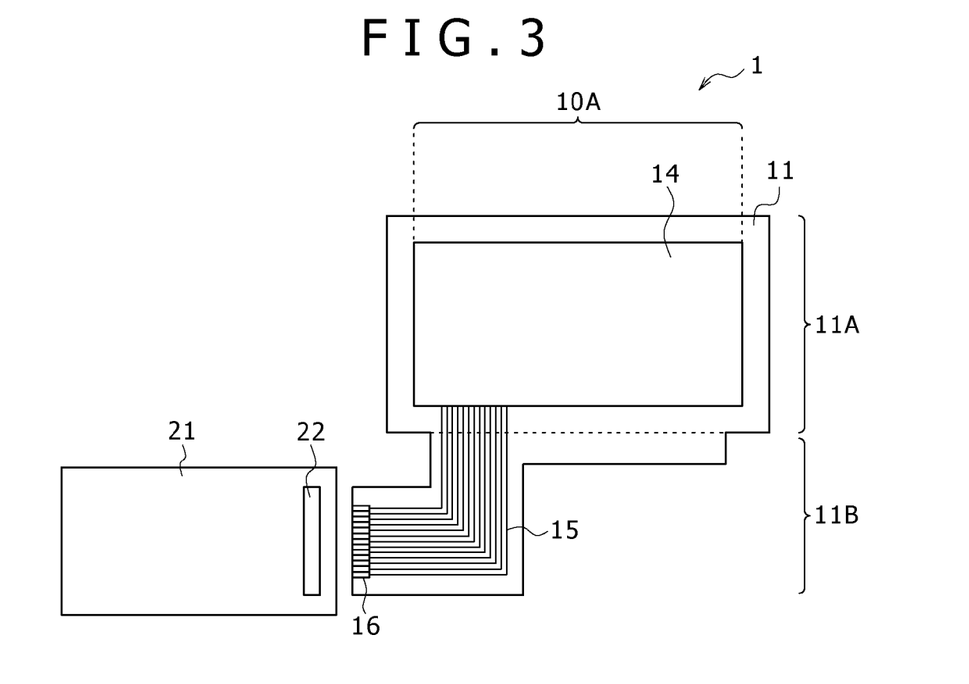
FIG. 3 is a diagram for explaining connection between a substrate shown in FIG. 1 and a control circuit board.

As shown in FIG. 1, the main board part 11A and the auxiliary board part 11B configure the same substrate (substrate 11). That is, the substrate 11 has the main board part 11A and the auxiliary board part 11B on the same surface. The main board part 11A (display area 10A) has a rectangular shape and drive wiring (including wiring of the TFT layer 12) is provided on the upper surface thereof. The auxiliary board part 11B has e.g. an L-character shape and is so provided as to be projected from part of the outer circumference of the main board part 11A. That is, the whole substrate 11 has a shape in which the L-character part is projected from part of the rectangular shape as shown in FIG. 1. The shape of the auxiliary board part 11B is not limited to the L-character shape as long as it allows easy connection to a control circuit board 21 (FIG. 3 to be described later). It is preferable for the main board part 11A and the auxiliary board part 11B to have such a shape that they can be simultaneously formed monolithically with each other by a punching die for example. In the present embodiment, the auxiliary board part 11B is provided at part of the long side of the main board part 11A. Extraction wiring 15 from the drive wiring is provided in the auxiliary board part 11B and an electrode 16 (external terminal) is disposed at the tip of the extraction wiring 15. The extraction wiring 15 is drawn from the drive wiring along the shape of the auxiliary board part 11B having the L-character shape in such a manner as to be bent from the direction perpendicular to the long side of the main board part 11A to the direction parallel to the long side. The electrode 16 is an object that is connectable to e.g. commercially-available (general-purpose) flexible printed circuit (FPC) and flexible flat cable (FFC), and is juxtaposed along the direction perpendicular to the long side of the main board part 11A.

In this display device 1, the control circuit board 21 formed of a separate component is connected to the display panel 10 (substrate 11) as shown in FIG. 3. Specifically, the electrode 16 of the auxiliary board part 11B is electrically connected to a connector 22 of the control circuit board 21. Due to this configuration, a control signal supplied by the control circuit board 21 is transmitted to the drive wiring via the extraction wiring 15 and the respective pixels of the display panel 10 are modulated. In the display device 1 of the present embodiment, the above-described auxiliary board part 11B is provided and therefore the control circuit board 21 can be connected to the display panel 10 without using a wiring board.

Figure 4:
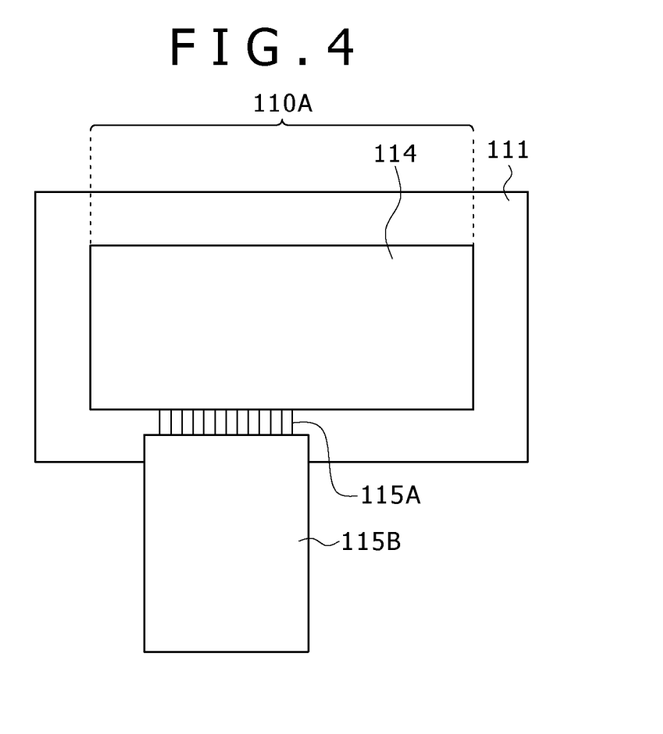
FIG. 4 is a plan view showing the configuration of a related-art display device.

As shown in FIG. 4, in a related-art display device, a wiring board 115B formed of a component fabricated separately from a substrate 111 is electrically connected to a terminal 115A at the peripheral part of the substrate 111 by e.g. an ACF and a control circuit board (not shown) is further connected to the wiring board 115B. In the description of this related-art display device, the part corresponding to that in the display device 1 is given a numeral that is in the 100s and has the same tens place digit and ones place digit. The substrate 111 does not have the auxiliary board part 11B (FIG. 1) and therefore the wiring board 115B is necessary to supply a signal of the control circuit board to the display panel. Because of requirements for the display device to have reduced frame area and reduced thickness, the flexible wiring board 115B is frequently folded by 180 degrees along the end surface of the substrate 111 and housed in a chassis.

In such a related-art display device, the terminal 115A is close to a display layer 113 (display area 110A) and therefore a step of connecting the substrate 111 to the wiring board 115B by thermal compression bonding possibly deteriorates the substrate 111 and the display layer 113. Furthermore, if the wiring board 115B is folded, spring back occurs in the wiring board 115B and there is also the possibility that disconnection between the terminal 115A of the substrate 111 and the wiring board 115B occurs. Moreover, for prevention of the disconnection between the terminal 115A and the wiring board 115B, the folding near the connection part between the substrate 111 and the wiring board 115B must be avoided and therefore a limit arises also regarding frame area reduction and thickness reduction. Although there has also been proposed a method in which the display panel is connected to a driver for driving and so forth without using the wiring board 115B (see e.g. WO2008/156175), the configuration of the connector part to connect the display panel to the driver for driving is complicated. Furthermore, this connector is disposed near the display layer and thus the problem of the deterioration of the display layer occurs as with the above description. Moreover, even when a flexible substrate (substrate 111) is used, the flexibility of the whole display device is lowered due to this complicated connector part.

In contrast, in the substrate 11 of the present embodiment, the extraction wiring 15 and the electrode 16 are provided in the auxiliary board part 11B. Therefore, the wiring board 115B is unnecessary and the control circuit board 21 can be connected directly to the substrate 11. This eliminates the need for the step of thermal compression bonding to connect the substrate 11 to the wiring board and thus can suppress the deterioration of the substrate 11 and the display layer 13. Furthermore, even when the substrate 11 is folded near the boundary between the main board part 11A and the auxiliary board part 11B, the possibility of disconnection is lower than that when a wiring board is folded near the connection part between separate components because one substrate 11 is folded. Thus, further reduction in the frame area and the thickness is also permitted. That is, the problem about the connection between the substrate 111 and the wiring board 115B, existing in the above-described related-art display device, can be eliminated. Furthermore, a complicated connector mechanism is unnecessary in the display device 1. Thus, by using the flexible substrate 11, the flexibility can be sufficiently reflected in the whole display device 1.

The TFT layer 12 has a function as a switching element for selecting the pixel. The TFT layer 12 may be configured by using either an inorganic TFT including an inorganic semiconductor layer as the channel layer or an organic TFT including an organic semiconductor layer.

A barrier layer may be provided between the substrate 11 and the TFT layer 12 in order to prevent the deterioration of the TFT layer 12 and the display layer 13 due to water and organic gas. Such a barrier layer is formed by using e.g. $AlO_xN_{1-x}$ (X=0.01 to 0.2) or silicon nitride ($Si_3N_4$).

The display layer 13 has an electrophoretic layer (electrophoretic display body) between pixel electrodes and a common electrode for example. That is, the display device 1 is an electrophoretic display (so-called electronic paper display) that displays images (e.g. character information) by utilizing the electrophoresis phenomenon. The pixel electrode is provided on the side of the TFT layer 12 for each pixel and the common electrode is provided over the whole surface of the transparent substrate 14.

A material similar to that of the substrate 11 can be used for the transparent substrate 14. An anti-moisture film to prevent water entry into the display layer 13 and an optical functional film to prevent reflection of ambient light into the display surface may be further provided over the transparent substrate 14.

Figure 5:
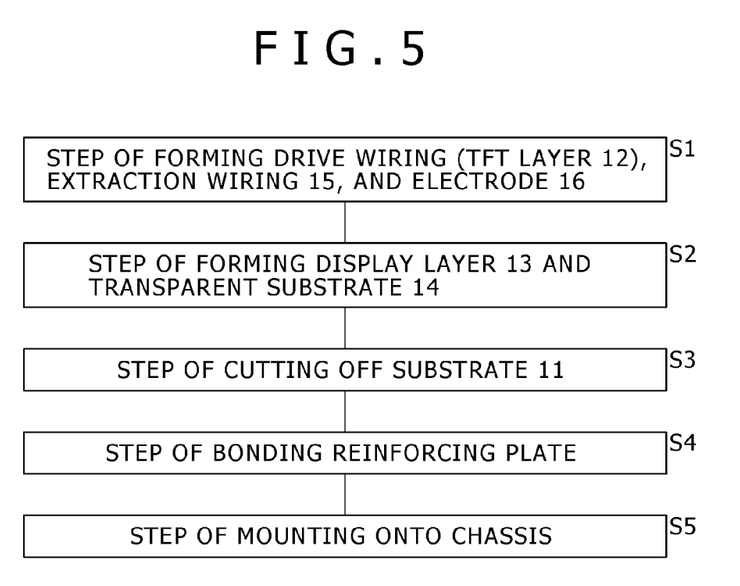
FIG. 5 is a flowchart showing steps of a manufacturing method of the display device shown in FIG. 1.

A manufacturing method of this display device 1 will be described below with use of FIG. 5.

First, for example, the drive wiring (wiring of the TFT layer 12), the extraction wiring 15, and the electrode 16 are formed by the same step on a substrate that is composed of a plastic material and from which multiple substrates are obtained (hereinafter, multiple-pattern substrate) (step S1). That is, at least part of each of the drive wiring, the extraction wiring 15, and the electrode 16 is configured by the same material. These metal wiring parts are protected by an insulating material such as an overcoat agent. Subsequently, pixel electrodes and an electrophoretic layer are formed over the TFT layer 12 and the transparent substrate 14 over which a common electrode is provided is bonded to the TFT layer 12. Thereby, the display layer 13 and the transparent substrate 14 are formed (step S2).

Subsequently, the multiple-pattern substrate over which the components to the transparent substrate 14 have been formed is divided (cut) into a shape like that shown in FIG. 1 by e.g. a press system with use of a mold (step S3). By performing punching by the press system in this manner, the main board part 11A and the auxiliary board part 11B can be simultaneously formed in the substrate 11 monolithically with each other. It is also possible to perform cutting by a plot system (cutter, roller blade) or laser cutting instead of the press system.

Subsequently, a reinforcing plate is bonded to the surface of the substrate 11 on the opposite side to the surface on which the electrode 16 is provided, i.e. on the lower surface of the substrate 11, in order to allow the electrode 16 to be connected to the connector 22 of the control circuit board 21 (step S4).

At last, the connector 22 of the control circuit board 21 is electrically and mechanically connected to the electrode 16 and mounting onto a chassis is performed (step S5), so that the display device 1 is completed.

Figure 6:
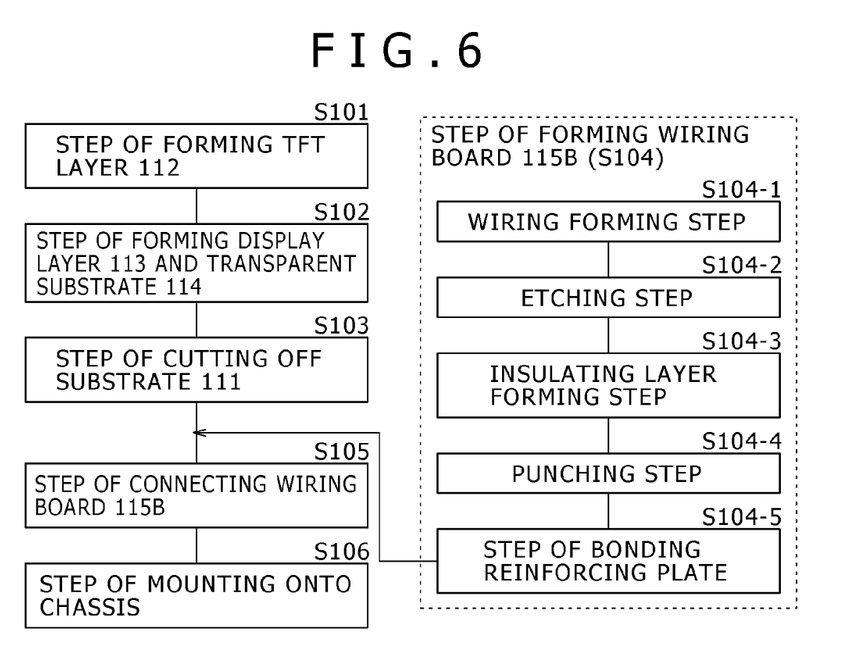
FIG. 6 is a flowchart showing steps of a manufacturing method of the display device shown in FIG. 4.

On the other hand, in a manufacturing step of the related-art display device, as shown in FIG. 6, a step of forming the wiring board 115B (step S104) and a step of connecting the wiring board 115B (step S105) are necessary in addition to steps S101, S102, and S103 corresponding to the above-described steps S1, S2, and S3, respectively. The wiring board 115B is formed through the following plural steps: wiring forming step (step S104-1), etching step (step S104-2), insulating layer forming step (step S104-3), punching step (step S104-4), and reinforcing plate bonding step (step S104-5). Thus, in the display device 1, the deterioration of the substrate 11 and the display layer 13 accompanying the step of connecting the wiring board is avoided, and the lead time and the cost can be reduced by simplifying the manufacturing step.

Furthermore, in the step of connecting the wiring board 115B, possibly bonding misalignment occurs between the substrate 111 and the wiring board 115B due to warpage and undulation of the substrate 111 and the wiring board 115B and the yield is lowered. In particular, this problem is noticeable if both the substrate 111 and the wiring board 115B are a flexible substrate. In the display device 1, such bonding misalignment also does not occur and the yield is enhanced.

In the display device 1 of the present embodiment, the auxiliary board part 11B is provided in the substrate 11 and thus the control signal from the control circuit board 21 is supplied to the drive wiring via the extraction wiring 15 of the auxiliary board part 11B. Due to this signal, modulation is performed on a pixel-by-pixel basis and images are displayed on the side of the transparent substrate 14.

As described above, in the display device 1 of the present embodiment, the auxiliary board part 11B is provided in the substrate 11. Thus, the control signal from the control circuit board 21 can be supplied to the drive wiring via the extraction wiring 15 of the auxiliary board part 11B without using a wiring board (wiring board 115B in FIG. 4). That is, the step of connecting the substrate 11 to the wiring board is unnecessary. Therefore, the deterioration of the substrate 11 and the display layer 13 due to this step does not occur and disconnection between the substrate 11 and the wiring board also does not occur. Thus, the reliability of the display device 1 can be enhanced.

Furthermore, if the substrate 11 is a flexible substrate, the substrate 11 can be folded at the boundary between the main board part 11A and the auxiliary board part 11B and housed in a chassis. Thus, the thickness and the frame area can be reduced. Moreover, because a complicated connector mechanism is unnecessary in the display device 1, the display device 1 that is freely foldable can be realized. In addition, because bonding misalignment between the substrate 11 and the wiring board does not occur, the yield can be enhanced.

Modification Example 1

Figure 7:
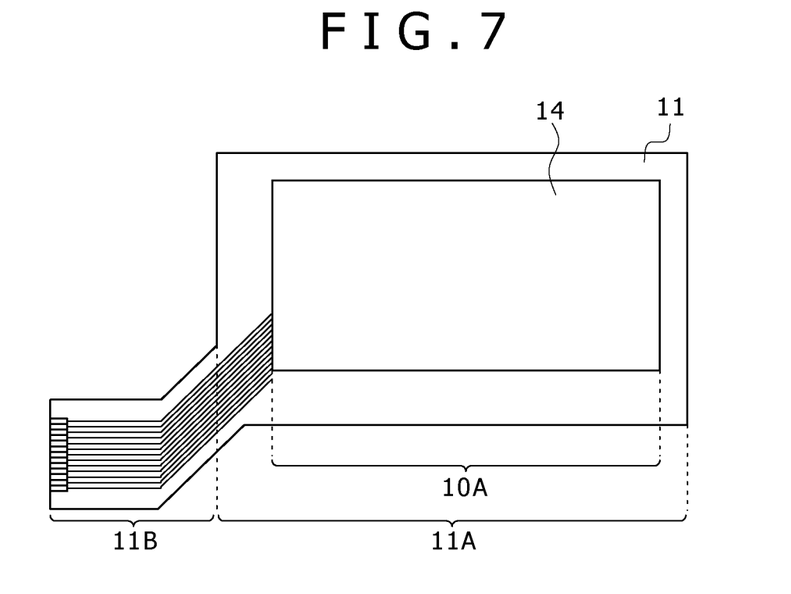
FIG. 7 is a plan view showing a configuration according to modification example 1 of the substrate shown in FIG. 1.

FIG. 7 shows the planar configuration of a substrate (substrate 11) according to modification example 1 of the display device 1 of the above-described embodiment. This substrate 11 has the auxiliary board part 11B having a substantially V-character shape at a corner of the main board part 11A having a substantially rectangular shape. Except for this point, this display device has the same configuration as that of the display device 1 of the above-described embodiment and operation and effects thereof are also the same.

The auxiliary board part 11B may be provided at any position on the outer circumference of the main board part 11A. It may be provided at the short side, of course, instead of the above-described long side or corner. If a wiring board needs to be connected like the related art, it is difficult that the wiring board is connected to a corner of the substrate 111 because the possibility of disconnection becomes higher. In the display device 1, the position and shape of the auxiliary board part 11B are arbitrary and thus the flexibility of the commercial product design can be enhanced.

Modification Example 2

Figure 8:
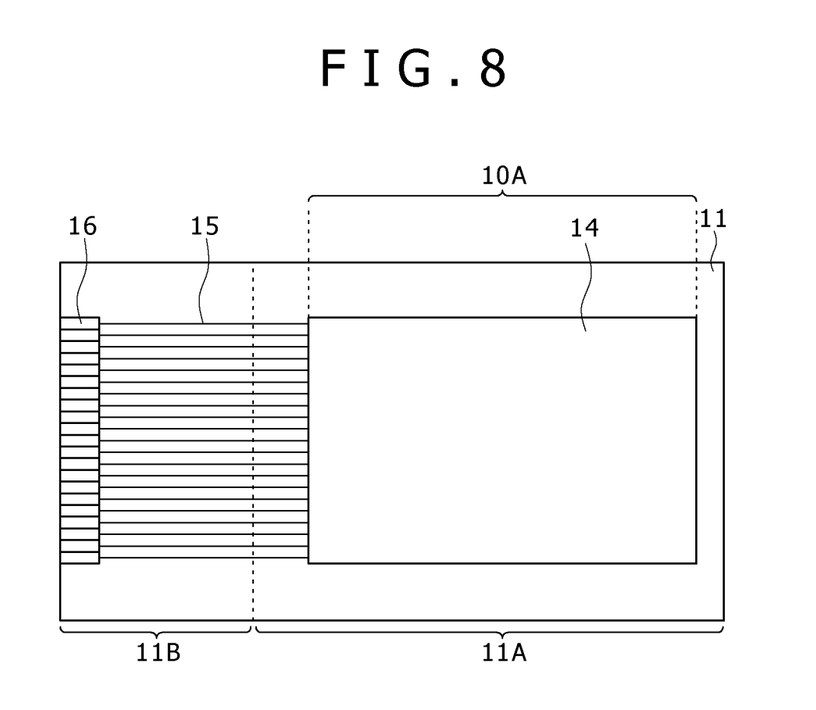
FIG. 8 is a plan view showing a configuration according to modification example 2 of the substrate shown in FIG. 1.

FIG. 8 shows the planar configuration of a substrate (substrate 11) according to modification example 2 of the display device 1 of the above-described embodiment. In this substrate 11, along the short side of the main board part 11A having a substantially rectangular shape, the auxiliary board part 11B with a substantially rectangular shape having the long side whose length is substantially the same as that of this short side is disposed. That is, the outer circumference of the whole substrate 11 has a substantially rectangular shape. Except for this point, this display device has the same configuration as that of the display device 1 of the above-described embodiment and operation and effects thereof are also the same.

The above-described display device 1 can be incorporated in pieces of electronic apparatus shown in the following application examples 1 to 6 for example.

Application Example 1

Figure 9A:
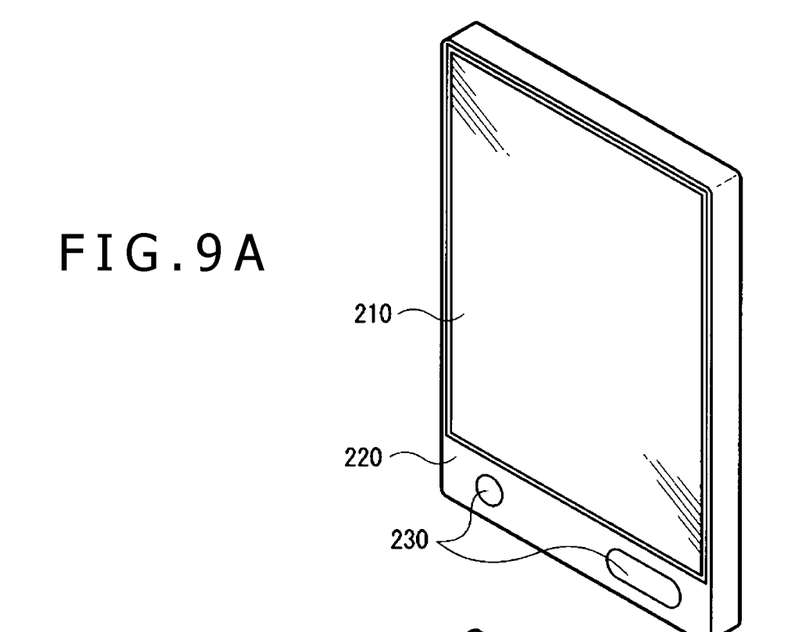
FIGS. 9A and 9B are perspective views showing the appearance of application example 1.
Figure 9B:
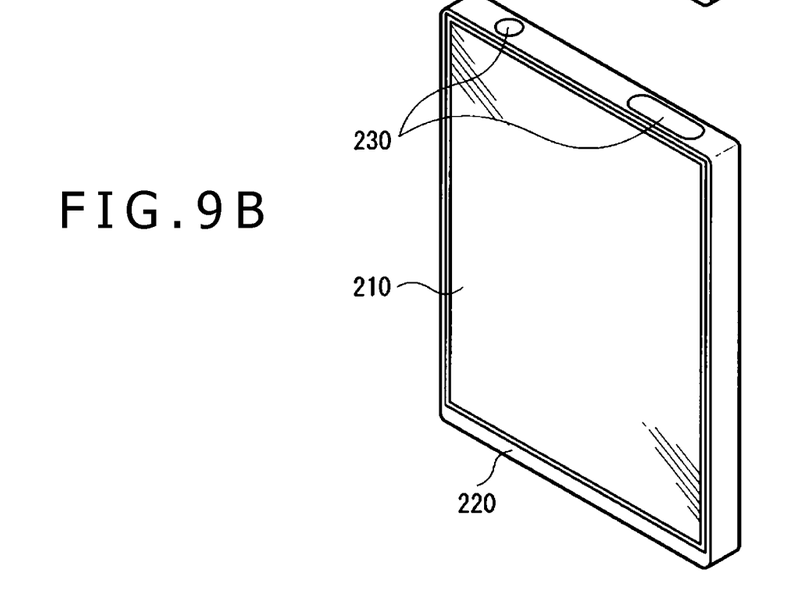

FIG. 9A and FIG. 9B show the appearance of an electronic book. This electronic book has e.g. a display section 210, a non-display section 220, and an operation section 230. The operation section 230 may be formed on the same surface (front surface) as that of the display section 210 as shown in FIG. 9A. Alternatively, it may be formed on a surface (top surface) different from that of the display section 210 as shown in FIG. 9B.

Application Example 2

Figure 10:
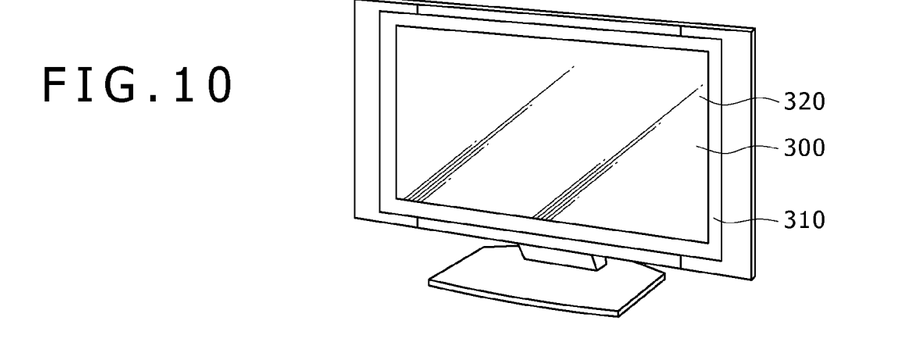
FIG. 10 is a perspective view showing the appearance of application example 2.

FIG. 10 shows the appearance of a television device. This television device has e.g. a video display screen section 300 including a front panel 310 and a filter glass 320.

Application Example 3

Figure 11A:
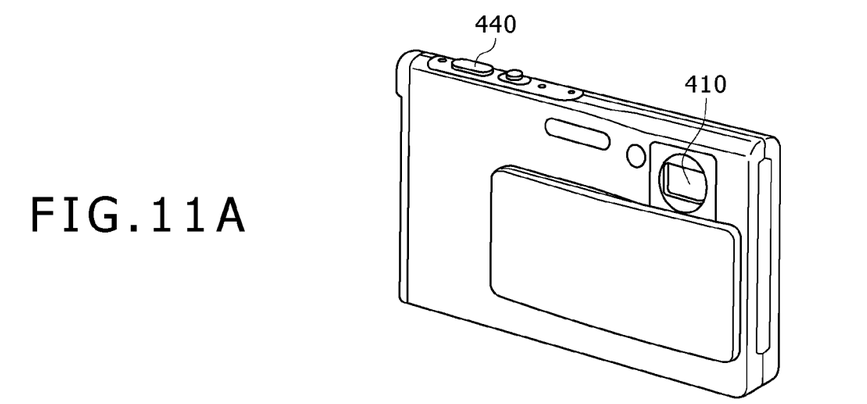
FIG. 11A is a perspective view showing the appearance of the front side of application example 3.
Figure 11B:
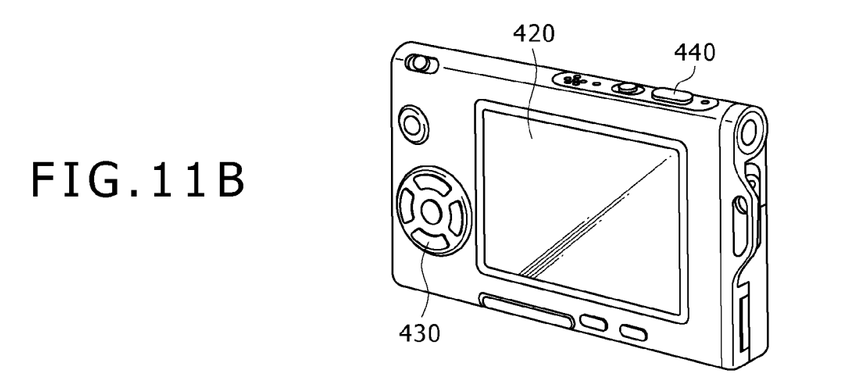
FIG. 11B is a perspective view showing the appearance of the back side.

FIGS. 11A and 11B show the appearance of a digital still camera. This digital still camera has e.g. a light emitter 410 for flash, a display section 420, a menu switch 430, and a shutter button 440.

Application Example 4

Figure 12:
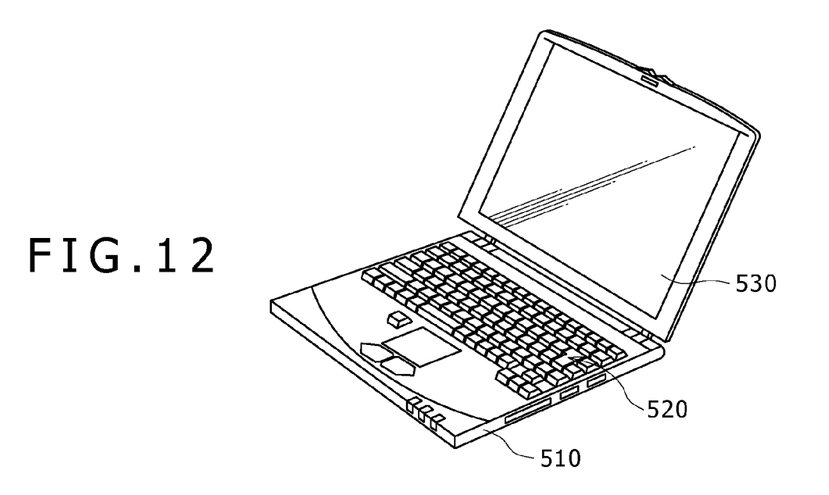
FIG. 12 is a perspective view showing the appearance of application example 4.

FIG. 12 shows the appearance of a notebook personal computer. This notebook personal computer has e.g. a main body 510, a keyboard 520 for input operation of characters and so forth, and a display section 530 that displays images.

Application Example 5

Figure 13:
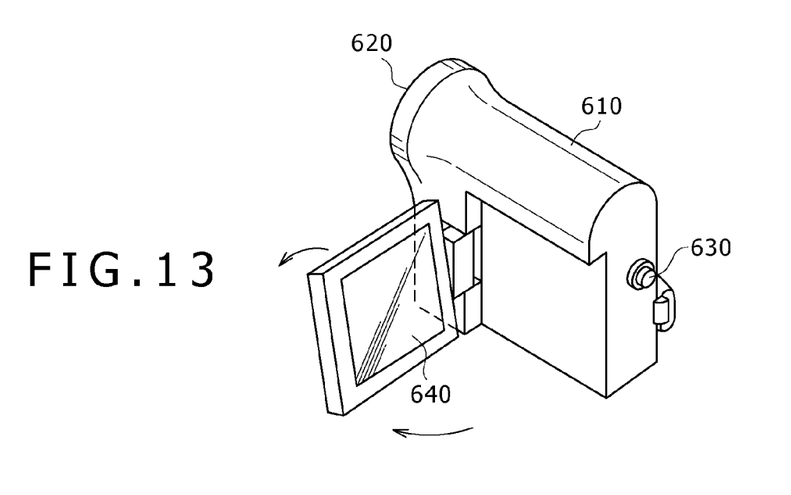
FIG. 13 is a perspective view showing the appearance of application example 5.
Figure 14A:
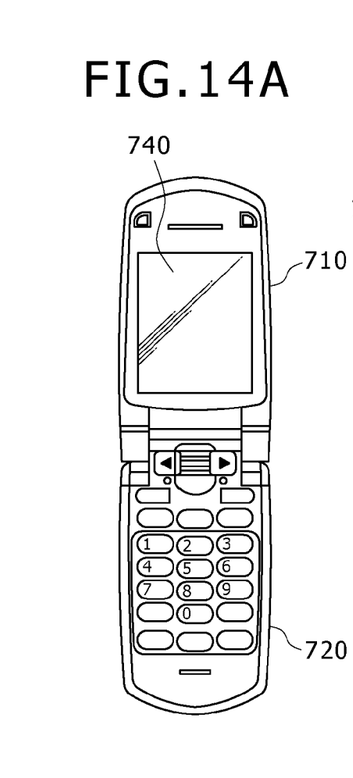
FIG. 14A is a front view of the opened state of application example 6.
Figures 14B, 14D:
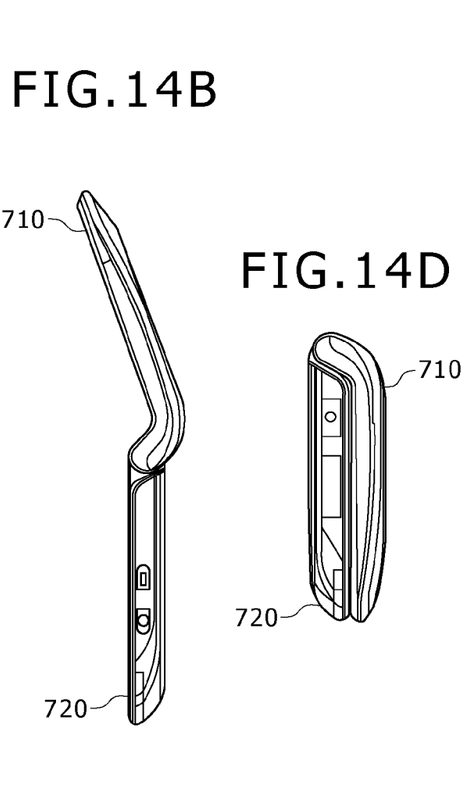
FIG. 14B is a side view thereof.
FIG. 14D is a left side view.
Figure 14C:
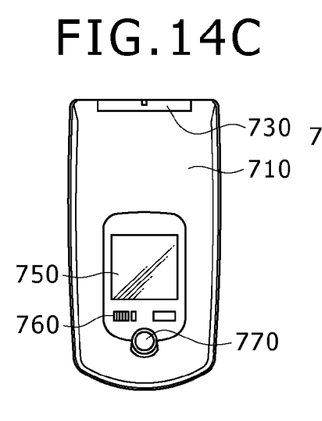
FIG. 14C is a front view of the closed state.
Figure 14E:
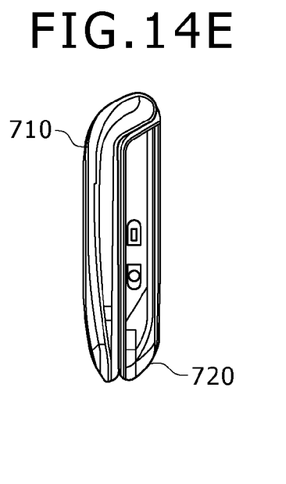
FIG. 14E is a right side view.
Figure 14F:
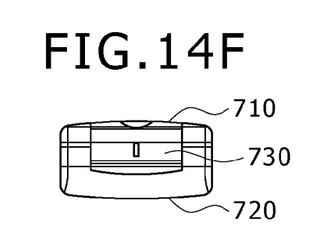
FIG. 14F is a top view.
Figure 14G:
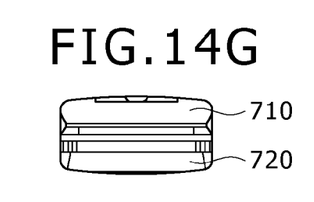
FIG. 14G is a bottom view.

FIG. 13 shows the appearance of a video camcorder. This video camcorder has e.g. a main body section 610, a lens 620 that is provided on the front side of this main body section 610 and is for subject photographing, a start/stop switch 630 operated in photographing, and a display section 640.

Application Example 6

FIGS. 14A to 14G show the appearance of a cellular phone. This cellular phone is made by coupling an upper chassis 710 to a lower chassis 720 by a coupling part (hinge part) 730 and has a display 740, a sub-display 750, a picture light 760, and a camera 770 for example.

Although the present technique is described above by taking the embodiment and modification examples, the present technique is not limited to the above-described embodiment and so forth and various modifications are possible. For example, in the above-described embodiment and so forth, the case in which the display layer 13 is formed of an electrophoretic layer is explained. However, the display layer 13 may be formed of e.g. a liquid crystal layer, an organic electroluminescence (EL) layer, or an inorganic EL layer.

The materials, thicknesses, film deposition methods, and film deposition conditions of the respective layers explained in the above-described embodiment and so forth are not limited. Other materials and thicknesses may be employed, and other film deposition methods and film deposition conditions may be employed.

Furthermore, although the description of the above-described embodiment and so forth is made by specifically explaining the configuration of the display device 1, all layers do not need to be included and another layer may be further included.

The present technique can employ also the following configurations.

(1) A display device including a main board part that has a display area including drive wiring and has a display panel disposed in the display area, and an auxiliary board part that is monolithic with the main board part and has extraction wiring from the drive wiring.

(2) The display device according to (1), wherein the auxiliary board part and the main board part configure the same substrate.

(3) The display device according to (1) or (2), wherein the auxiliary board part has an L-character shape and is so disposed as to be projected from part of outer circumference of the main board part having a substantially rectangular shape.

(4) The display device according to (2) or (3), wherein the substrate is a flexible substrate.

(5) The display device according to one of (1) to (4), wherein an external terminal exists at a tip of the extraction wiring and a control circuit board is electrically connected to the external terminal.

(6) The display device according to one of (1) to (5), wherein at least part of each of the drive wiring and the extraction wiring is configured by the same material.

(7) Electronic apparatus including a display device, the display device including a main board part that has a display area including drive wiring and has a display panel disposed in the display area, and an auxiliary board part that is monolithic with the main board part and has extraction wiring from the drive wiring.

The present disclosure contains subject matter related to that disclosed in Japanese Priority Patent Application JP 2011-084731 filed in the Japan Patent Office on Apr. 6, 2011, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. A display device comprising:
   a main board portion having a rectangular shape and a display area including drive wiring, wherein the main board portion includes a display panel disposed in the display area;
   an auxiliary board portion monolithically formed with the main board portion and so disposed as to be projected from a portion less than an entire side of the main board portion, wherein the auxiliary board portion includes:
      a first segment projected in a first direction and a second segment projected in a second direction, wherein the first segment of the auxiliary board portion is between the main board portion and the second segment of the auxiliary board portion;
      extraction wiring drawn from the drive wiring along a shape of the first and second segments of the auxiliary board portion; and
      an external terminal disposed at a tip of the extraction wiring on the second segment of the auxiliary board portion; and
   a control circuit board electrically and mechanically connected to the external terminal on the second segment of the auxiliary board portion such that a control signal supplied by the control circuit board to the external terminal is transmitted to the drive wiring of the display area via the extraction wiring on the first and second segments of the auxiliary board portion.

2. The display device according to claim 1, wherein the auxiliary board portion comprises an L-character shape.

3. The display device according to claim 1, wherein the main board portion and the auxiliary board portion include a substrate that is a flexible substrate.

4. The display device according to claim 1, wherein at least part of each of the drive wiring and the extraction wiring comprises the same material.

5. An electronic apparatus including a display device, the display device comprising:
   a main board portion having a rectangular shape and a display area including drive wiring, wherein the main board portion includes a display panel disposed in the display area;
   an auxiliary board portion monolithically formed with the main board portion and so disposed as to be projected from a portion less than an entire side of the main board portion, wherein the auxiliary board portion includes:
      a first segment projected in a first direction and a second segment projected in a second direction, wherein the first segment of the auxiliary board portion is between the main board portion and the second segment of the auxiliary board portion;
      extraction wiring drawn from the drive wiring along a shape of the first and second segments of the auxiliary board portion; and
      an external terminal disposed at a tip of the extraction wiring on the second segment of the auxiliary board portion; and
   a control circuit board electrically and mechanically connected to the external terminal on the second segment of the auxiliary board portion such that a control signal supplied by the control circuit board to the external terminal is transmitted to the drive wiring of the display area via the extraction wiring on the first and second segments of the auxiliary board portion.

6. The electronic apparatus according to claim 5, wherein the auxiliary board portion comprises an L-character shape.

7. The electronic apparatus according to claim 5, wherein the main board portion and the auxiliary board portion include a substrate that is a flexible substrate.

8. The electronic apparatus according to claim 5, wherein at least part of each of the drive wiring and the extraction wiring comprises the same material.

* * * * *